(12) United States Patent
Navas et al.

(10) Patent No.: US 10,590,787 B2
(45) Date of Patent: Mar. 17, 2020

(54) GAS TURBINE ENGINE

(71) Applicant: ROLLS-ROYCE plc, London (GB)

(72) Inventors: Borja Navas, Barcelona (ES); Peter Leyman, Bristol (GB); Lee Davitt, Bristol (GB)

(73) Assignee: ROLLS-ROYCE plc, London (GB)

(*) Notice: Subject to any disclaimer, the term of this patent is extended or adjusted under 35 U.S.C. 154(b) by 253 days.

(21) Appl. No.: 15/567,540

(22) PCT Filed: Apr. 29, 2016

(86) PCT No.: PCT/EP2016/059666
§ 371 (c)(1),
(2) Date: Oct. 18, 2017

(87) PCT Pub. No.: WO2016/177644
PCT Pub. Date: Nov. 10, 2016

(65) Prior Publication Data
US 2018/0135448 A1 May 17, 2018

(30) Foreign Application Priority Data
May 7, 2015 (GB) .................................. 1507818.1

(51) Int. Cl.
*F01D 9/06* (2006.01)
(52) U.S. Cl.
CPC .................................. *F01D 9/065* (2013.01)
(58) Field of Classification Search
CPC .......... F01D 9/065; F01D 9/041; F01D 11/06; F01D 25/12; F01D 25/162; F01D 25/305; F05D 2220/32; F05D 2260/232
See application file for complete search history.

(56) References Cited

U.S. PATENT DOCUMENTS 2,759,700 A  8/1956  Wheatley
2,789,416 A  4/1957  Mirza
(Continued)

FOREIGN PATENT DOCUMENTS

EP   2497907 A2  9/2012
EP  02497907 A2  9/2012
(Continued)

OTHER PUBLICATIONS

Nov. 3, 2015 Search Report issued in Great Britain Patent Application No. 1507818.1.
(Continued)

*Primary Examiner* — Richard A Edgar
(74) *Attorney, Agent, or Firm* — Oliff PLC

(57) ABSTRACT

A turboshaft engine has a principal rotational axis and comprises a power turbine, tail bearing housing, and exhaust collector arranged in axial flow series along the axis. The tail bearing housing has radially central region defining flow chamber for cooling air, and an annular duct defined around the central region and which forms at least part of exhaust flow passage for the flow of exhaust gases from the power turbine to the exhaust collector. The flow chamber is provided in fluid communication with the exhaust collector via at least one exhaust port formed in the tail bearing housing such that the flow of exhaust gases along the exhaust collector during operation of the engine educes flow of cooling air through the central flow chamber by drawing air through the or each exhaust port and into the exhaust collector.

14 Claims, 8 Drawing Sheets

(56) References Cited

U.S. PATENT DOCUMENTS

| | | | |
|---|---|---|---|
| 4,217,755 A | 8/1980 | Williams | |
| 5,160,080 A * | 11/1992 | Hines | F02C 6/203 |
| | | | 60/751 |
| 9,316,153 B2 * | 4/2016 | Patat | F01D 9/065 |
| 2005/0160740 A1 | 7/2005 | Nakano et al. | |
| 2010/0322759 A1 | 12/2010 | Tanioka | |
| 2011/0079019 A1 | 4/2011 | Durocher et al. | |
| 2012/0321451 A1 * | 12/2012 | Xiao | F01D 9/041 |
| | | | 415/180 |
| 2013/0223985 A1 | 8/2013 | Hashimoto | |
| 2014/0205447 A1 | 7/2014 | Patat et al. | |

FOREIGN PATENT DOCUMENTS

| | | |
|---|---|---|
| JP | H02-196137 A | 8/1990 |
| JP | 2005-226639 A | 8/2005 |
| JP | 2009-167800 A | 7/2009 |
| WO | 2013/125074 A1 | 8/2013 |
| WO | 2014/105616 A1 | 7/2014 |

OTHER PUBLICATIONS

Jul. 28, 2016 International Search Report issued in International Patent Application No. PCT/EP2016/059666.
Jul. 28, 2016 Written Opinion issued in International Patent Application No. PCT/EP2016/059666.
Oct. 2, 2019 Office Action issued in Japanese Patent Application No. 2017-558383.

* cited by examiner

GAS TURBINE ENGINE

The present invention relates to a gas turbine engine, and more particularly to a turboshaft engine.

A turboshaft engine is a type of gas turbine engine which is optimised to produce shaft power rather than propulsive thrust. Turboshaft engines are commonly used to power watercraft such as ships, boats and hovercraft, and also to power tanks and helicopters. Turboshaft engines can also be used in auxiliary power units and for industrial power generation.

A typical turboshaft engine includes, in axial flow series: an intake section, a compressor section, a combustion section, a gas turbine section, a power turbine section and an exhaust section. During operation, a flow of ambient air is drawn into the engine via the intake section and directed into the compressor section where the air is compressed before being delivered to the combustion section where the compressed air is mixed with fuel. The resulting fuel/air mixture is then ignited within the combustion section, and the resulting combustion gases expand rapidly through the gas and power turbine sections and thereby drive rotation of the turbines therein. Rotation of the/each gas turbine within the gas turbine section drives rotation of one or respective compressor rotors within the compressor section via respective interconnecting shafts. Rotation of the power turbine (which is sometimes referred to as the "free turbine" in arrangements in which the power turbine is configured to rotate independently of the/each gas turbine) drives an output shaft, which serves as the rotary output of the turboshaft engine. Depending upon the function of the turboshaft engine, the output shaft may be coupled to a power generator and/or a propulsive arrangement, such as the propeller of a ship or the main rotor of a helicopter. After flowing through the power turbine section, the combustion gases are expelled from the engine through the exhaust section.

Whilst the present invention is described herein with particular reference to a marine turboshaft engine of a type which is configured to provide propulsive power to a ship, it is to be appreciated that the invention is not limited to a marine turboshaft engine and could be embodied in other types of turboshaft engine.

As will be appreciated, the end of the output shaft which is connected to the power turbine of the engine must be supported by a bearing, which is known as the tail bearing because it is provided at the tail end of the engine immediately after the power turbine. The tail bearing is enclosed within an annular housing which is axially adjacent the power turbine on the downstream side of the power turbine relative to the primary flow direction through the engine. The tail bearing housing provides support for the output shaft and represents the main support connecting the engine to the ship's structure. Torque reaction is taken from the housing through trunnion mounts on either side.

The tail bearing housing usually includes a central part which houses the actual tail bearing, and includes a series of circumferentially spaced-apart supporting vanes which extend radially outwardly from the central part to a peripheral part of the housing and which extend across the exhaust gas flow path. The exhaust gases from the core of the engine thus flow past the vanes. Some of the vanes are usually simply structural, but others are used to route various fluid flow lines and wiring to and from the central part of the housing. For example, oil supply lines are routed through some of the vanes in order to provide lubricating oil to the tail bearing, whilst other vanes are used to route electrical wiring for speed probes, or air flow lines. These service vanes are thus generally hollow to accommodate the lines or wires therethrough.

It is important to cool the above-mentioned service vanes of the tail bearing housing, particularly those used to route oil supply and scavenge lines in order to avoid oxidation and thermal breakdown of the oil therein which can result in the accumulation of coke deposits over time which can in turn create blockages in the lines. This becomes particularly important when the engine is shut down after a period of operation. In prior art arrangements it is conventional to cool the tail bearing housing by directing a large volume of cooling air into the central part of the tail bearing housing along a large pipe extending into the tail end of the engine. This air is delivered by a large fan which is mounted outside the engine housing, usually on its supporting baseplate, and which is arranged to push air into the tail central region of the tail bearing housing such that the air is then directed outwardly through all of the housing's vanes thereby dissipating heat from the vanes. Because the volume of air required for this cooling is so large, the fan itself must be large. Typically three-phase axial fans are used which require a three-phase power supply and are noisy. The large size of such fans increases the footprint of the engine package.

Additionally it has been proposed to bleed off a flow of compressed air from a downstream region of the engine's compressor section and to use that bleed flow to pressurise seals in the engine. One such seal which is commonly pressurised by compressor bleed air in this manner is a labyrinth type seal provided around the output shaft in the region of the tail bearing housing. However this involves directing the compressor bleed air through the seal which means that the air will be vented to the surrounding atmosphere, which in the case of marine gas turbine engine used to power a ship will be the surrounding machinery space or engine room. This is generally disadvantageous for several reasons. For example, allowing the compressor bleed flow to leak into the surrounding machinery space will increase the temperature in the machinery space. Also, it is common for the bleed flow to include a small amount of combustion gases which such not be leaked into the machinery space. And in the case of military ships in which the machinery space must be sealed from the atmosphere to protect against nuclear of biological attack, no compressor bleed flow must be allowed to leak into the machinery space because it could include contaminants drawn into the engine from outside the ship via the engine's intake. It is therefore desirable to prevent leakage of the compressor bleed air from the shaft labyrinth seal into the surrounding machinery space.

It is therefore an object of the present invention to provide an improved turboshaft engine.

According to a first aspect of the present invention, there is provided a turboshaft engine having a principal rotational axis and comprising a power turbine, a tail bearing housing and an exhaust collector arranged in axial flow series along said axis, the tail bearing housing having a radially central region defining a flow chamber for cooling air; and an annular duct defined around the central region and which forms at least part of an exhaust flow passage for the flow of exhaust gases from the power turbine to the exhaust collector, characterised in that the flow chamber is provided in fluid communication with said exhaust flow passage via at least one exhaust port formed in the tail bearing housing such that the flow of exhaust gases through the exhaust collector during operation of the engine educes a flow of cooling air through the central flow chamber.

Conveniently, the engine further comprises a compressor and the tail bearing housing includes a labyrinth seal configured for pressurisation by a flow of compressed air drawn from the compressor and directed through the labyrinth seal, the or each exhaust port being provided in fluid communication with the labyrinth seal such that the flow of exhaust gases along said exhaust flow passage during operation of the engine educes a flow of said compressed air from said labyrinth seal, through the or each exhaust port and into the exhaust flow.

Advantageously, the tail bearing housing further comprises a plurality of vanes extending radially outwardly from the central region and across the annular duct, at least some of said vanes having respective airflow passages therethrough which are arranged in fluid communication with the flow chamber for the passage of cooling air.

Preferably, not all of said vanes have airflow passages in fluid communication with the flow chamber.

Conveniently, only vanes which carry either oil or vent pipes have a said airflow passage in fluid communication with the flow chamber.

Optionally, the engine further comprises a fan fluidly connected to least one of said vane airflow passages, the fan being operable to draw cooling air radially outwardly from the flow chamber through the or each said airflow passage to which it is connected.

Conveniently, said fan is operable in the absence of a sufficient flow of exhaust gas along said exhaust flow passage, to draw a flow of cooling air through each said vane airflow passage and through the flow chamber.

Advantageously, said fan is also operable, in the absence of a sufficient flow of exhaust gas along said exhaust flow passage, to draw a flow of said compressed air from the labyrinth seal and through said flow chamber.

Preferably, the engine is provided within an acoustic housing and said fan may also be provided within the acoustic housing.

According to a second aspect of the present invention, there is provided a method of operating a turboshaft engine having a principal rotational axis and comprising a power turbine, a tail bearing housing and an exhaust collector arranged in axial flow series along said axis, wherein the tail bearing housing has a radially central region defining a flow chamber for cooling air, and an annular duct defined around the central region and which forms at least part of an exhaust flow passage for the flow of exhaust gases from the power turbine to the exhaust collector; the flow chamber being provided in fluid communication with said exhaust collector via at least one exhaust port formed in the tail bearing housing, the method involving the step of directing sufficient flow of exhaust gas through the exhaust collector to educe a flow of cooling air through the central flow chamber and into the exhaust flow via the or each exhaust port.

Advantageously, the method is performed on an engine which further comprises a compressor and in which the tail bearing housing includes a labyrinth seal provided in fluid communication with the or each exhaust port, the method involving the steps of drawing a flow of compressed air from the compressor and directing it through the labyrinth seal to pressurise the seal, and directing sufficient flow of exhaust gas from said power turbine along said exhaust flow passage to educe a flow of said compressed air from said labyrinth seal and into the exhaust flow via the or each exhaust port.

Preferably, the method is performed on an engine whose tail bearing housing further comprises a plurality of vanes extending radially outwardly from the central region and across the annular duct, at least some of said vanes being provided with respective airflow passages therethrough which are arranged in fluid communication with the flow chamber for the passage of cooling air, wherein said step of directing exhaust gas involves directing a sufficient flow of exhaust gas along said exhaust flow passage to draw a flow of cooling air through at least some of said airflow passages, through the flow chamber and into the exhaust flow via the or each exhaust port.

Optionally, said cooling air may be drawn only through said airflow passages which are provided through vanes carrying either oil or vent pipes.

Conveniently, the engine includes a fan fluidly connected to at least one of said vane airflow passages, and the method involves operating the fan to draw cooling air radially outwardly from the flow chamber through the or each airflow passage to which it is connected.

Preferably, said fan is operated to draw a flow of cooling air through each said vane airflow passage and through the flow chamber when the flow of exhaust gas along said exhaust flow passage is insufficient to educe a flow of cooling air through the central flow chamber and into the exhaust flow via the or each exhaust port.

Advantageously, said fan is also operated to draw a flow of said compressed air from the labyrinth seal and through said flow chamber when the flow of exhaust gas along said exhaust flow passage is insufficient to educe a flow of said compressed air from said labyrinth seal and into the exhaust flow via the or each exhaust port.

So that the invention may be more readily understood, and so that further features thereof may be appreciated, embodiments of the invention will now be described by way of example with reference to the accompanying drawings in which.

Figure 1:
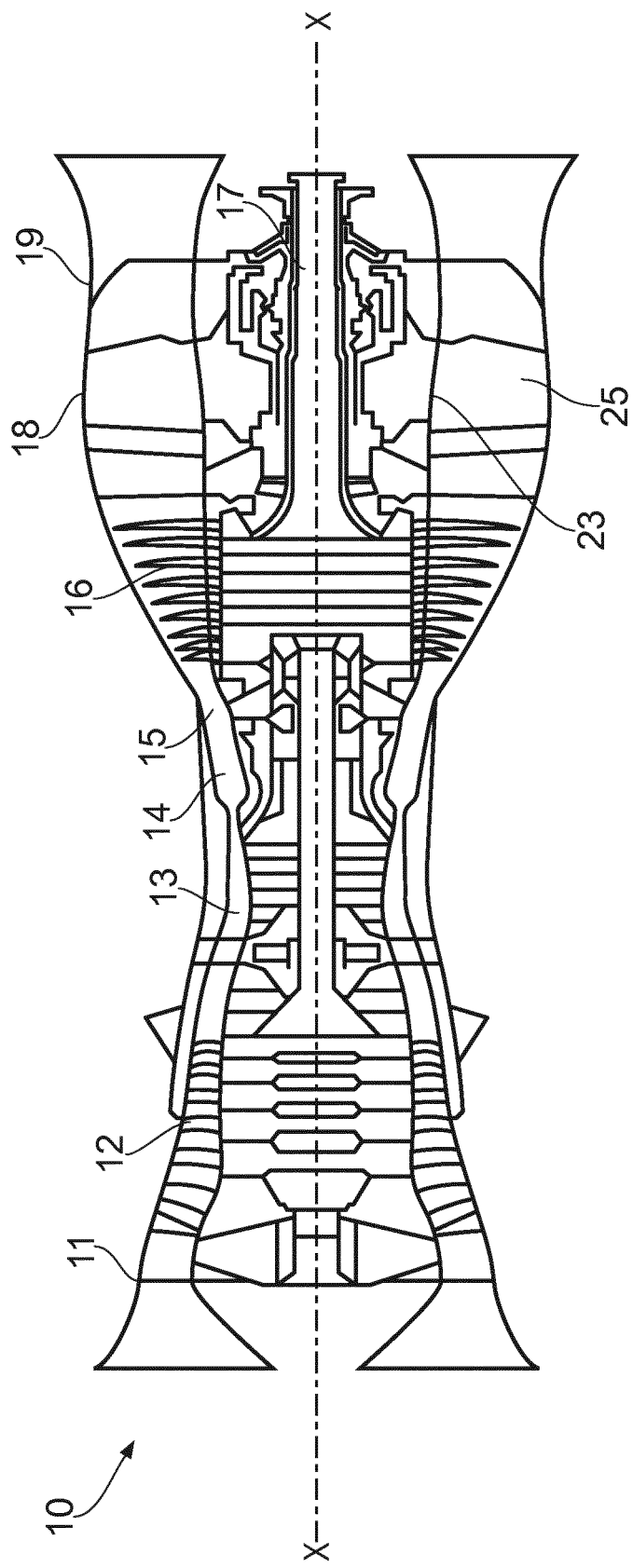
FIG. 1 is a longitudinal cross-sectional view through a marine turboshaft engine.

Turning now to consider the drawings in more detail, FIG. 1 illustrates a marine turboshaft engine 10 having a principal and rotational axis X-X. The engine comprises, in axial flow series, an air intake 11, an intermediate pressure compressor 12, a high pressure compressor 13, combustion equipment 14, a high pressure turbine 15, a power turbine 16 coupled to an output shaft 17, tail bearing housing 18, and an exhaust collector 19 (only part of which is shown in FIG. 1).

During operation, air entering the intake 11 is directed into the intermediate pressure compressor 12 which compresses the air flow before delivering that air to the high pressure compressor 13 where further compression takes place. The compressed air is exhausted from the high pressure compressor 13 is directed into the combustion equipment 14 where it is mixed with fuel and the mixture combusted. The resultant hot combustion products then expand through, and thereby drive the high pressure turbine 15 and the power turbine 16 before being exhausted through an outer region of the tail bearing housing 18 and the exhaust collector 19. The high pressure turbine 15 and the power turbine 16 respectively drive the high and intermediate pressure compressors 13, 12 by interconnecting shafts. Additionally, the power turbine 16 drives the engine's output shaft 17 to which it is directly connected, with the engine-end of the output shaft 17 being supported by a bearing mounted within an inner part of the tail bearing housing 18.

Figure 2:
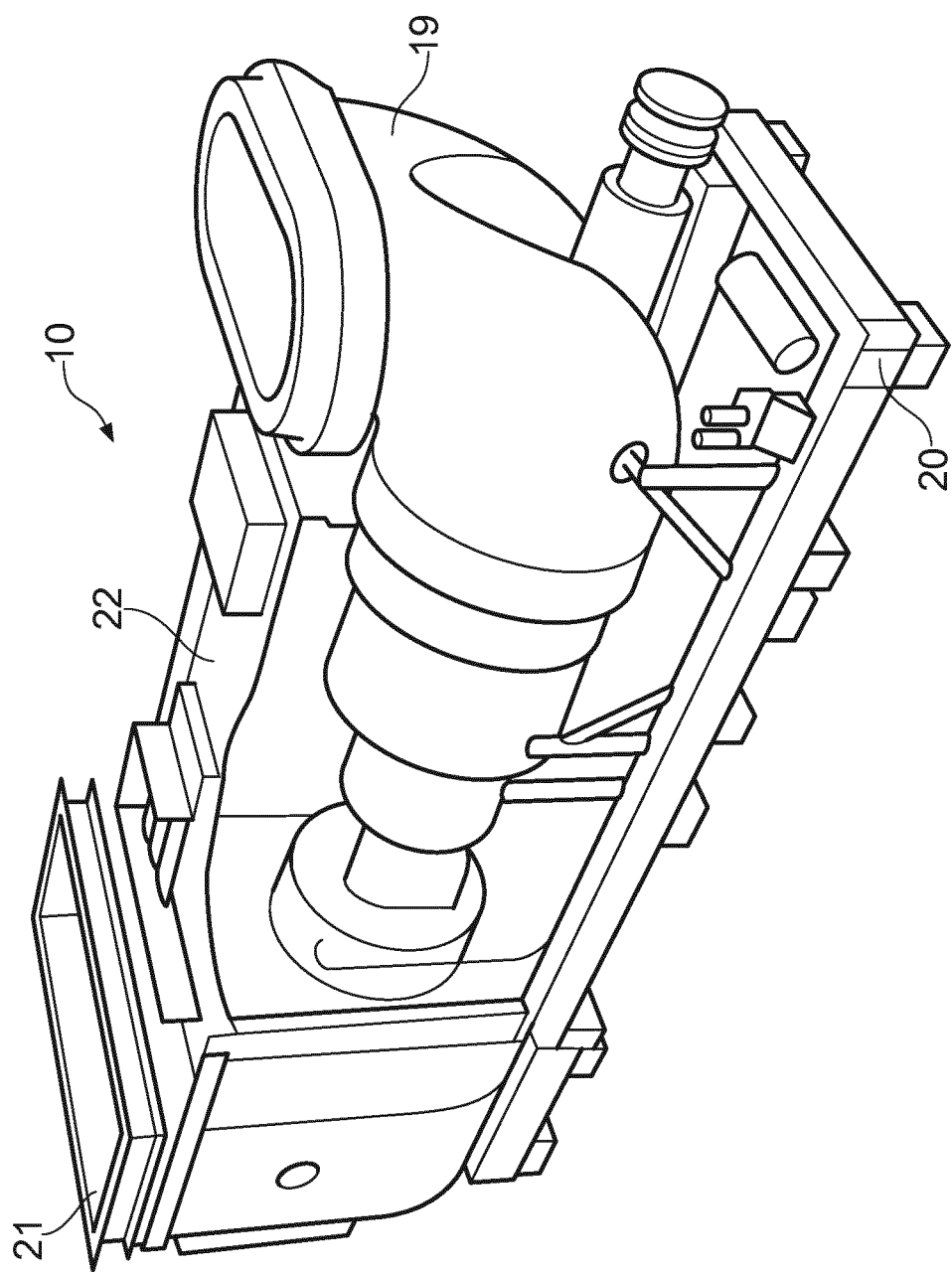
FIG. 2 is a perspective view of a marine turboshaft engine with part of its acoustic enclosure shown cut-away for clarity.

FIG. 2 illustrates a typical marine engine 10 in perspective view. As will be noted, the engine 10 is mounted on a supporting baseplate 20 and includes a large intake duct 21 which is connected directly to the above-mentioned air intake 11 at the front of the engine. The core of the engine, comprising the compressors 12, 13, the combustion equipment 14 and the turbines 14, 15 is usually enclosed within an acoustic housing 22, which is shown in partially cut-away form in FIG. 2 for the sake of clarity. FIG. 2 also shows the complete exhaust collector 19, which it will be noted has a generally annular configuration at its upstream end, which merges into an upwardly directed duct at its downstream end in order to direct the exhaust gas away from the engine via suitable external ducting. This configuration of the exhaust collector can also be seen in more detail in FIG. 3.

Figure 3:
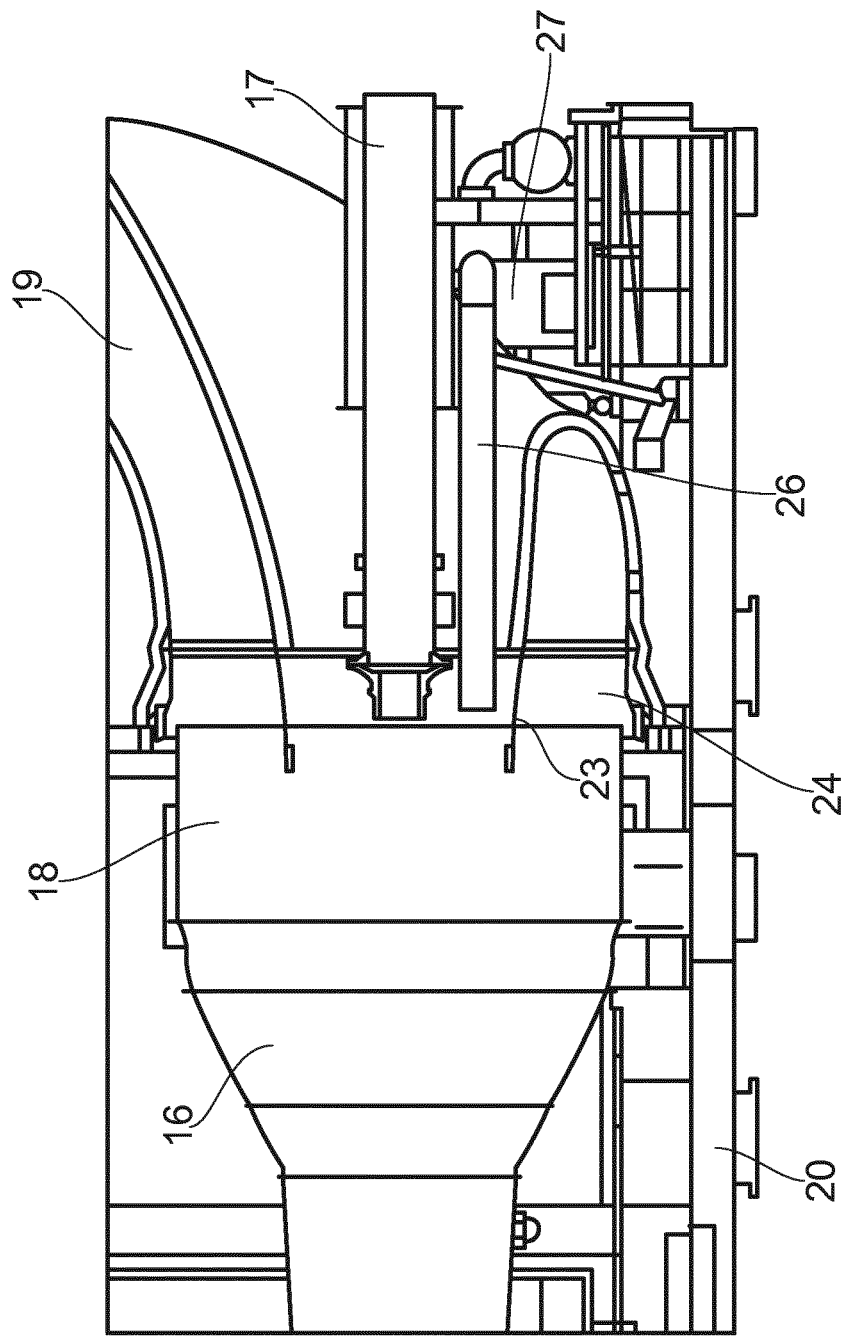
FIG. 3 is an enlarged longitudinal cross-sectional view of a turboshaft engine showing a prior art arrangement to cool the engine's tail bearing housing.
Figure 4:
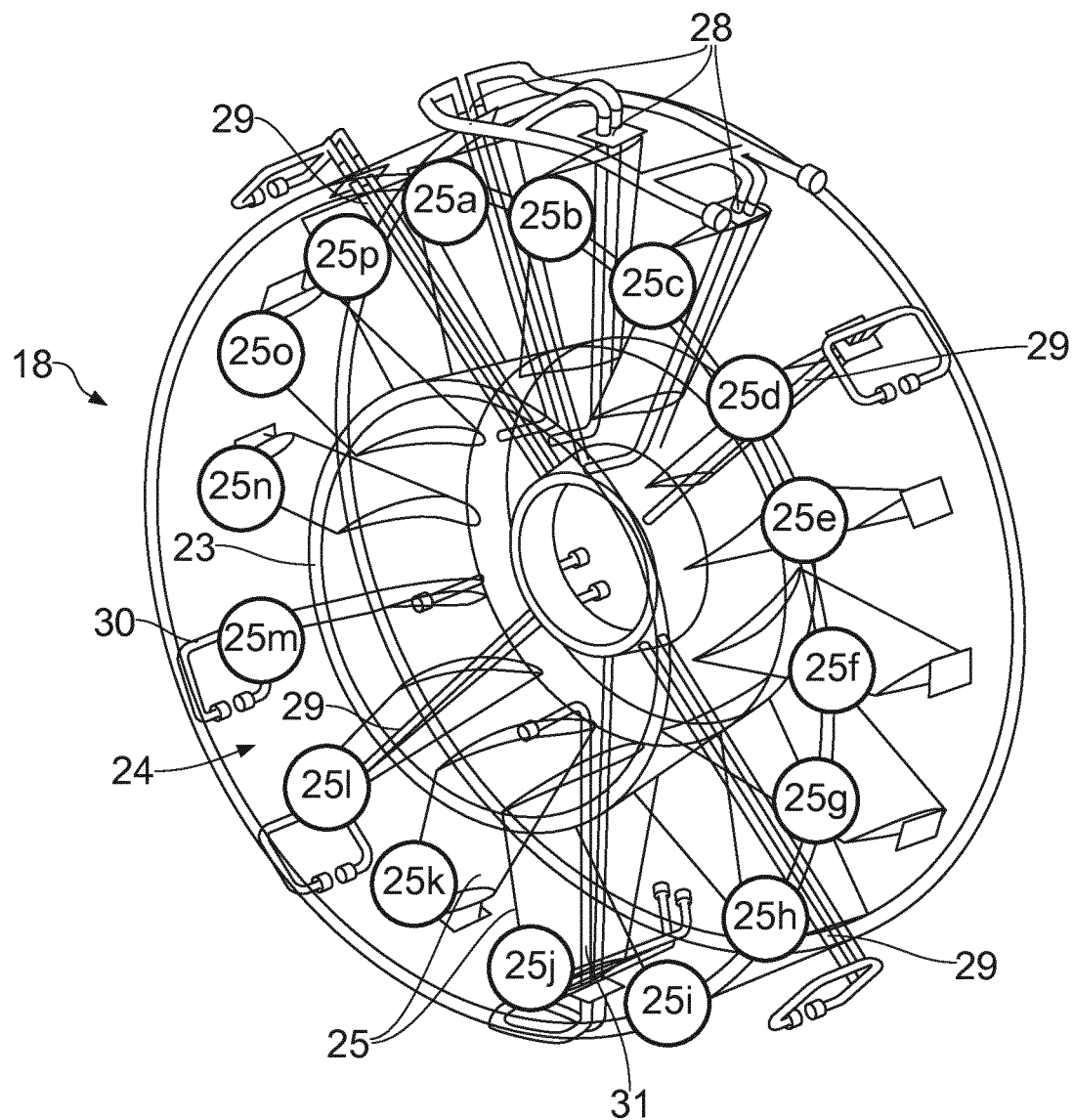
FIG. 4 is a schematic perspective view showing a tail bearing housing with its service vanes.

As illustrated most clearly in FIG. 4, but also having regard to FIG. 1, the tail bearing housing 18 is generally annular in configuration, comprising a central region 23 which defines a central chamber and encloses and supports the main supporting bearing for the output shaft 17, and an annular duct 24 which is defined around the central region 23 and which, as shown most clearly in FIGS. 1 and 3, cooperates with the exhaust collector 19 to define part of an annular exhaust flow passage for the flow of exhaust gases from the power turbine 16.

The tail bearing housing 18 further comprises a plurality of circumferentially spaced apart support vanes 25 which extend radially outwardly from the central region 23 and across the annular duct 24.

As already indicated above, conventional tail bearing housings are configured such that several, or even sometimes all of the vanes 25 carry service lines from the outer region of the housing radially inwards to the central chamber within the central region 23. As such the vanes 25 are usually hollow and provided in fluid communication with central chamber. FIG. 3 illustrates a conventional arrangement for cooling a tail bearing housing of the general type described above, and in particular for cooling the central region of the housing and the vanes which are provided in fluid communication therewith. Accordingly, it will be noted that the engine is equipped with a large airflow pipe 26 which extends forwardly into the central chamber of the tail bearing housing 18. The pipe 26 is conventionally connected to a large fan 27 mounted the rear end of the engine's baseplate 20, outside the acoustic housing 22. This type of prior art cooling arrangement works by the fan 27 pushing a large volume of cooling air forwardly into the central chamber of the tail bearing housing and thereafter radially outwardly through the hollow vanes 25. Because the vanes 25 are arranged to receive cooling air in this manner, the fan 27 is typically required to be very large, and in practice is very noisy. The noise of the fan 27 is exacerbated by the fact that its location on the baseplate 20 does not permit it to be enclosed within the engine's acoustic housing 22.

Turning now to consider FIG. 4 in more detail, there is shown detail of a particular configuration of tail bearing housing 18 which is suitable for inclusion in an embodiment of the present invention. In the particular housing arrangement illustrated, the tail bearing housing 18 comprises a total of sixteen vanes 25 extending radially across its annular duct 24, the individual vanes being denoted by the letters a, b, c . . . p respectively. The uppermost three vanes 25a, 25b, 25c are used to route vent lines 28 radially inwardly to the central region 23 of the housing. Vanes 25d, 25h, 25i and 25p are used to route air service lines 29 to the chamber defined within the central region 23 of the housing. Vanes 25e and 25o are used to route speed probe wiring to the central region 23. Vane 25m is used to route an oil supply pipe 30 to the central chamber, for the supply of lubricating oil to the bearing therein, whilst vane 25j is used to route a cooperating oil scavenge pipe 31 from the central chamber. It is to be noted that vanes 25m and 25j carrying the oil pipes 30, 31 are both located in a lower region of the annular housing 18.

It has been found that of all of the service lines routed to the central region 23 of the tail bearing housing 18 via respective vanes, the oil pipes 30 and 31 are the most susceptible to problems if they are not sufficiently cooled during operation of the engine. This is because coke can be formed via oxidation and thermal breakdown of the lubricating oil which is directed through the pipes 30, 31, and such coke formations can cause the pipes 30, 31 to become blocked if it is allowed to build up. It is therefore important to ensure that the pipes 30, 31 and their respective vanes 25m, 25j, are adequately cooled. However, it is not considered so important to cool directly the other service lines because they do not carry oil and are thus less susceptible to blockage from the build-up of coke deposits. Embodiments of the present invention can therefore be configured such that only some of the vanes 25, including the oil service line vanes 25m, 25j, are actively cooled, this being achieved by providing the respective vanes 25 with internal airflow passages therethrough as will be described below.

Figure 5:
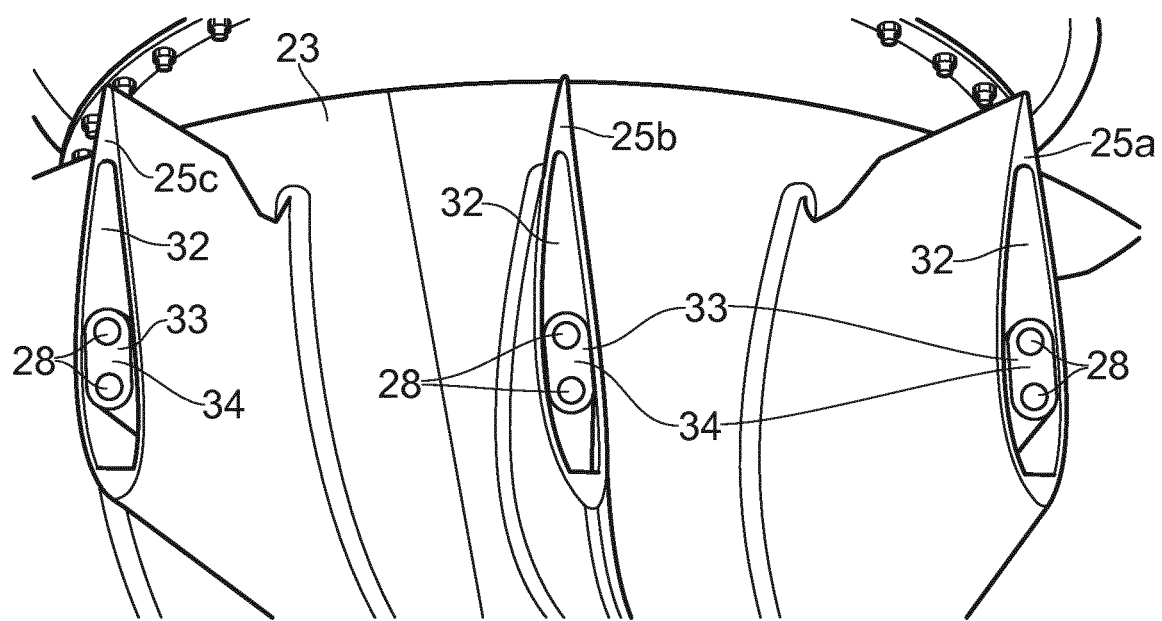
FIG. 5 is a cross-sectional view taken through the three uppermost service vanes of the tail bearing housing of FIG. 4, viewed in a radially inwards direction.

FIG. 5 illustrates a sectional view taken through the three uppermost service vanes 25a, 25b, 25c. As will be noted, these vanes are of hollow construction such that each has an internal cavity 32 extending therethrough in order to accommodate the air service lines 28. Around the air service lines 28 within each vane, there is also provided a heat shield 33, each of which defines a respective airflow passage 34 through the vane. Each airflow passage 34 is provided in fluid communication with the chamber defined within the central region 23 of the tail bearing housing 18. The vanes 25m, 25j carrying the oil pipes 30, 31 are also provided with similar airflow passages 34 around the pipes 30, 31 and extending through the vanes 25m, 25j in fluid communication with the chamber defined within the central region 23 of the housing 18. It is to be noted, however, that preferred embodiments are configured such that none of the other vanes 25 have such airflow passages 34. As will become clear hereinbelow, by providing only some of the vanes 25 with airflow passages, through which cooling air is directed, the mass flow rate of cooling air required to cool the tail bearing housing 18 is greatly reduced relative to the prior art arrangements described above.

Figure 6:
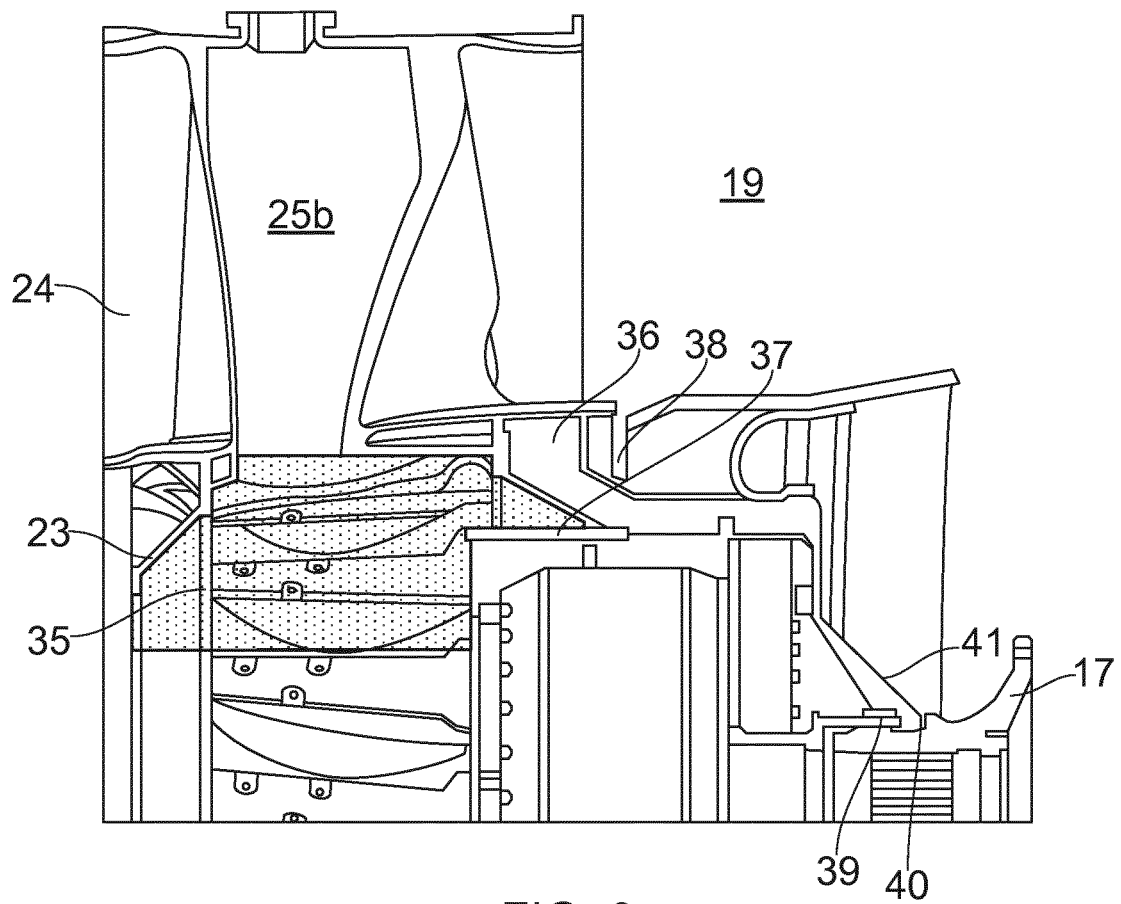
FIG. 6 is a radial cross-sectional view through part of the tail bearing housing and the end of an output shaft.

FIG. 6 is a transverse part-sectional view which illustrates the central region 23 of the tail bearing housing 18 in more detail. In particular, the chamber 35 defined within the central region 23 is illustrated, which it is to be noted is generally annular in configuration and represents a flow chamber for cooling air, as will be described in more detail below. As explained above, the annular flow chamber 23 is provided in direct fluid communication with the uppermost three service vanes 25a, 25b, 25c (carrying the air supply pipes 28), and the two service vanes 25m, 25j (carrying the oil pipes 30, 31 but not illustrated in FIG. 6). As explained above, the two vanes 25m, 25j carrying the oil pipes 30, 31 are both located towards the lower region of the annular housing 18, and are thus below the airflow chamber 35, whilst of course the three uppermost vanes 25a, 25b, 25c carrying the air supply pipes 28 are located above the flow chamber 35.

Figure 8:
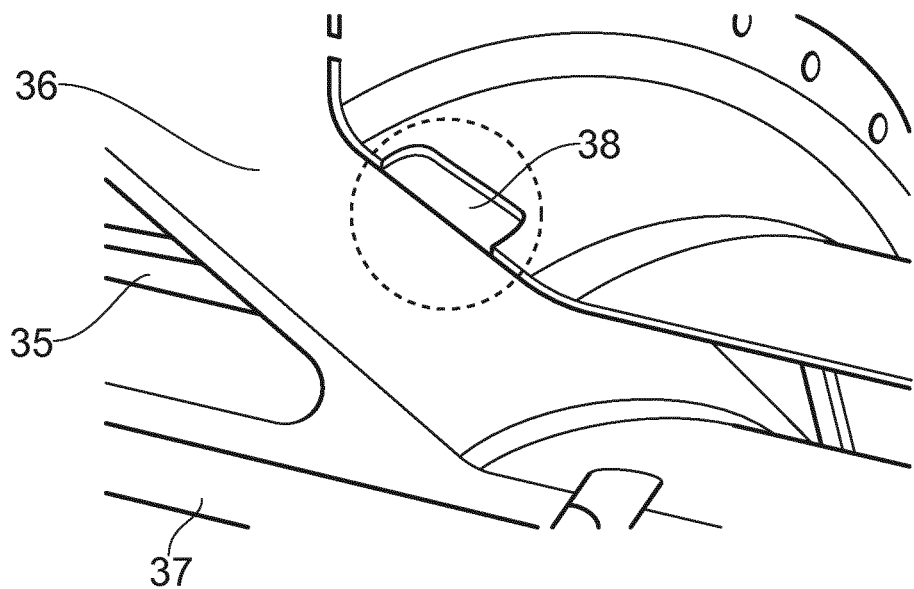
FIG. 8 is a part-sectional perspective view showing a rear part of the tail bearing housing.

Located axially rearwardly of the main central flow chamber 35, the housing 18 further comprises a secondary annular flow chamber 36. The main flow chamber 35 and the secondary flow chamber 36 are provided in fluid communication with one another via a plurality of circumferentially spaced apart flow passages 37. Furthermore, the secondary flow chamber 36 is provided in direct fluid communication with the exhaust flow passage defined through the exhaust collector 19, via a plurality of small and circumferentially spaced-apart exhaust ports 38 formed in a rear part of the central region 23 of the tail bearing housing 18. One such port is illustrated in perspective view in FIG. 8. As will thus be appreciated, the main flow chamber 35 is thus provided in (indirect) fluid communication with the exhaust flow passage defined through the exhaust collector 19 via the exhaust ports 38.

Figure 7:
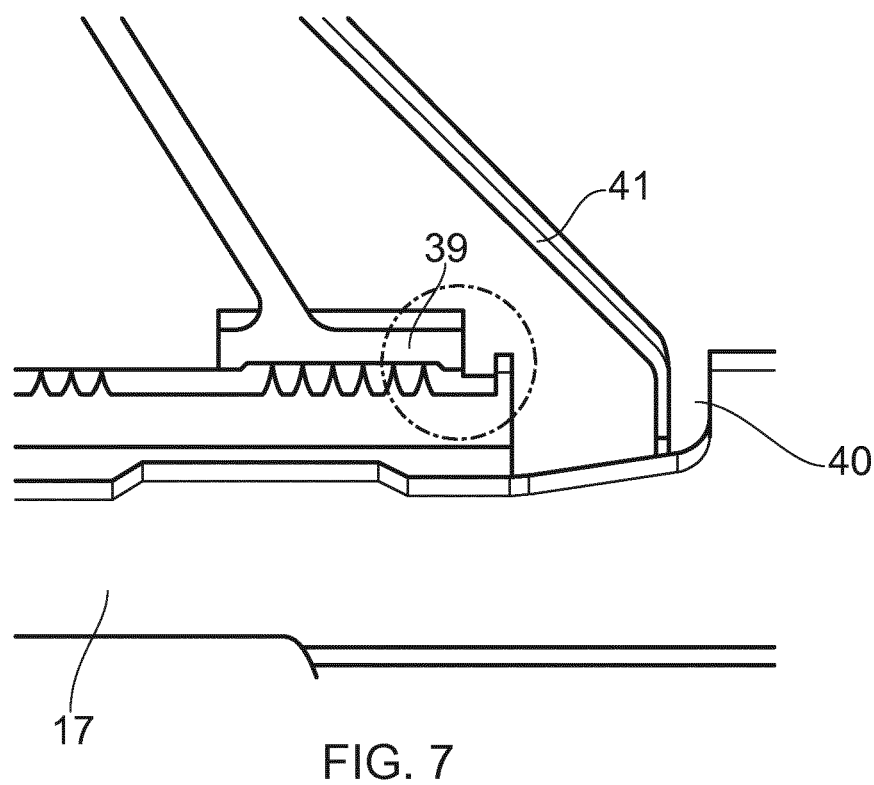
FIG. 7 is a view similar to that of FIG. 6, but shows a labyrinth seal of the tail bearing housing in enlarged view.

As also illustrated in FIG. 6, and in closer detail in FIG. 7, the tail bearing housing 18 also includes a labyrinth seal 39 around the end of the output shaft 17, in the generally conventional manner described hereinbefore. As is common, the labyrinth seal 39 is pressurized with a flow of compressed air which is drawn from the compressor section of the engine, and most preferably from a relatively downstream region of the engine's intermediate pressure compressor 12. The compressed air will be directed through the labyrinth seal 39 in a generally rearwards direction and if not collected on exit from the seal 39 will leak through the small gap 40 which is located between the rear cone 41 of the central region 23 of the tail bearing housing 18 and the output shaft 17. In order to assist in the collection of the compressed air leaking through the labyrinth seal 39 in this manner, the rear cone 41 of the housing 18 is configured such that the secondary flow chamber 36 extends radially inwardly to the gap 40.

Figure 9:
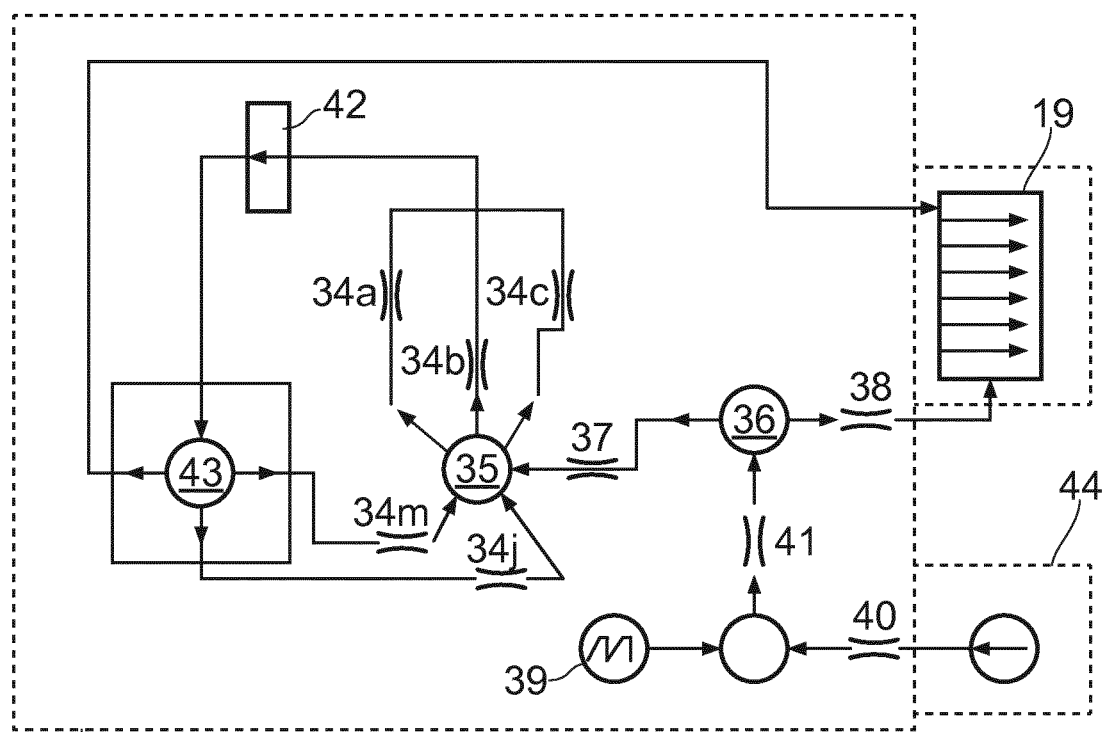
FIG. 9 is schematic airflow network diagram.

FIG. 9 is an airflow network diagram which illustrates schematically the manner in which the various flow chambers, passages and ports described above are interconnected in order to assist in understanding the manner in which the arrangement of the present invention operates in cooling the tail bearing housing.

The flow passages 34a, 34b, 34c defined through the three uppermost service vanes 25a, 25b, 25c, (and which are all directly fluidly connected to the main central flow chamber 35 at their radially innermost ends) are each fluidly connected at their radially outermost ends to an electric fan 42 which is located within the engine's acoustic housing 22 and thus operates in the internal volume (denoted schematically at 43) inside the acoustic housing 22. The two lower airflow passages through the vanes 25m, 25j carrying the oil pipes 30, 31 are denoted as 34m and 34j respectively, and it will be noted that these are not connected to the fan 42 and so are simply open to the internal volume 43 inside the acoustic housing 22 at their radially outermost ends.

As will also be noted, FIG. 9 shows the labyrinth seal 39 and the gap 40 between the rear cone of the tail bearing housing and the output shaft both fluidly connected to the secondary flow chamber 36, which itself is fluidly connected to the main annular airflow chamber 35 by the flow passages 37. In this regard, it is to be noted that the radially outwardly narrowing configuration of the rear cone 41 of the housing serves as a restriction to the flow from the labyrinth seal 35 to the secondary chamber 36. The gap 40 is shown in direct fluid communication with the machinery space (e.g. the engine room of a ship) within which the engine is installed, as denoted by 44 in FIG. 9. Additionally, FIG. 9 shows the secondary flow chamber 36 being provided in direct fluid communication with the exhaust flow path through the exhaust collector 19.

It is envisaged that the cooling airflow arrangement of the above-described engine arrangement will have a number of different operational modes or stages, as will now be described with particular reference to FIGS. 10 to 12.

Figure 10:
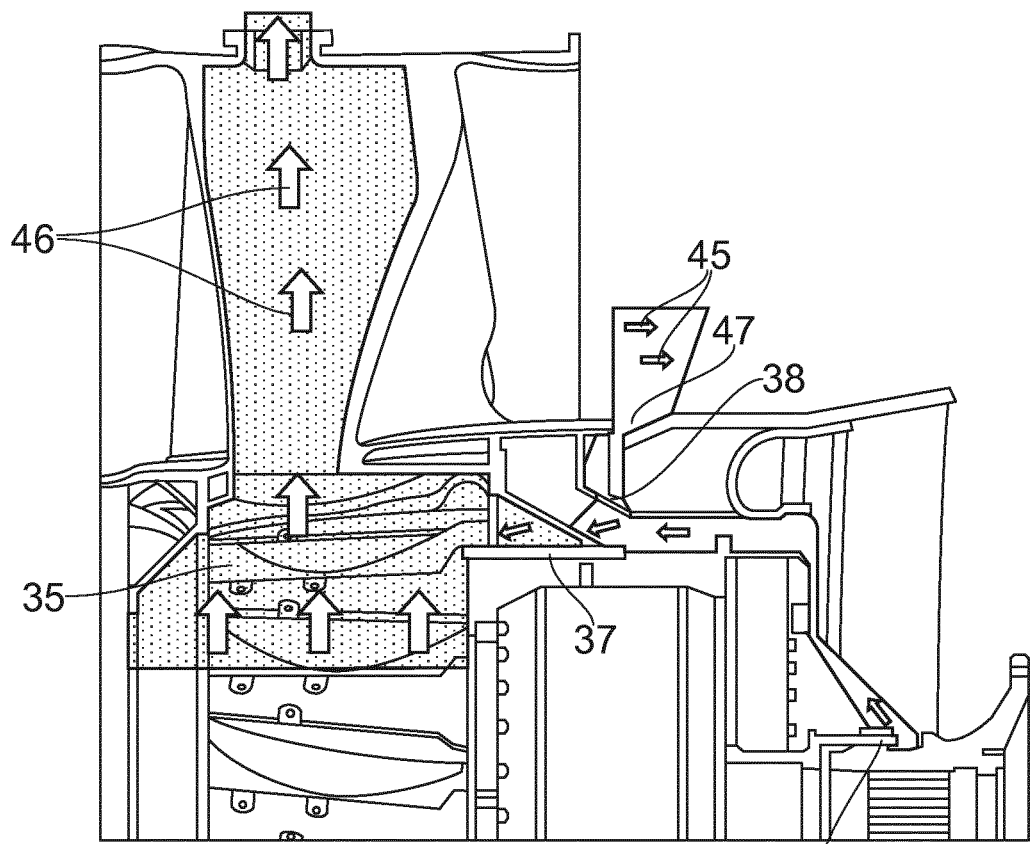
FIG. 10 is a schematic illustration similar to FIG. 6, but which shows airflow characteristics during engine idle conditions.

FIG. 10 shows airflow characteristics of a proposed cooling mode which will be used during periods of relatively low power operation of the engine 10 which might arise, for example, at idle engine speeds. Idle conditions are characterised by relatively low kinetic energy in the exhaust gases (denoted by arrows 45 in FIG. 10) directed from the power turbine 16 and through the exhaust flow passage defined by the outer duct 24 of the tail bearing housing 18 and the exhaust collector 19. Also, because the rotational speed of the engine is relatively low during idle conditions, the flow of compressed air which will be bled from the engine's compressor section and directed through the labyrinth seal 39 will also be relatively low.

During such conditions it is envisaged that the fan 42 will be operated in order to pull a flow of cooling air (denoted by arrows 46 in FIG. 10) through the upper airflow passages 34a, 34b, 34c formed through the three uppermost service vanes 25a, 25b, 25c, and thereby to also pull cooling air through the main central flow chamber 35 and through the airflow passages 34m, 34j formed through the two lower service vanes 25m, 25j (carrying the oil pipes 30, 31) from the internal volume 43 inside the acoustic housing 22. It is to be noted in this regard, that because the fan is only required to pull this cooling air through a relatively small number of the total number of vanes 25, the mass flow rate of cooling air moved by the fan is significantly reduced. This allows the fan to be relatively small, and thus easily accommodated within the acoustic housing 22.

Additionally, the above-described operation of the fan 42 during idle conditions will create a reduced pressure within the main annular chamber 35, which will thus be effective to pull air from the secondary rear flow chamber 36, via the flow passages 37, thereby also drawing through the compressed air leaking through the labyrinth seal 39, thus preventing it from leaking into the machinery space 44 via the gap 40 around the shaft 17.

It is to be noted that whilst the fan 42 is operational during periods of very low energy exhaust flow through the exhaust flow path, the resultant low pressure generated in the main and secondary flow chambers 35, 36 may draw a small volume of exhaust gas from the exhaust flow path via the exhaust ports 38, as denoted by arrow 47 in FIG. 10. However, it is proposed that the exhaust ports 38 will be carefully configured, particularly in terms of their size, in order to minimise any such effect.

Figure 11:
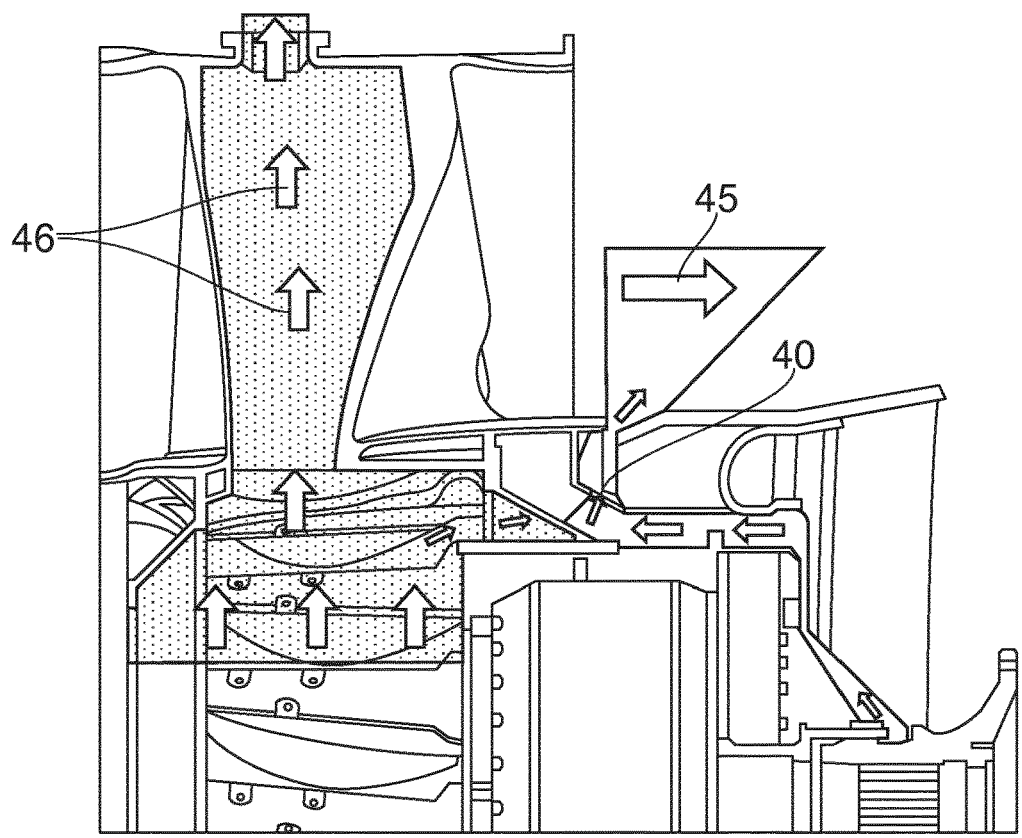
FIG. 11 is a schematic illustration similar to that of FIG. 10, but which shows airflow characteristics during maximum power engine conditions.

FIG. 11 shows airflow characteristics of a proposed cooling mode which will be used during periods of relatively high power operation of the engine 10 which might arise, for example, at maximum or standard operational engine speeds. Such high power conditions are characterised by relatively high kinetic energy in the exhaust gases (denoted by arrows 45 in FIG. 10) directed from the power turbine 16 and through the exhaust flow passage defined by the outer duct 24 of the tail bearing housing 18 and the exhaust collector 19.

During such conditions it is envisaged that the fan 42 will continue to operate so as to pull a flow of cooling air (denoted by arrows 46 in FIG. 10) through the upper airflow passages 34a, 34b, 34c formed through the three uppermost service vanes 25a, 25b, 25c, thereby also pulling cooling air through the main central flow chamber 35 and through the airflow passages 34m, 34j formed through the two lower service vanes 25m, 25j (carrying the oil pipes 30, 31) from the internal volume 43 inside the acoustic housing 22. However, during periods of relatively high power operation of the engine 10, at which point the cooling requirement for the main flow chamber 35 is increased, the above-described airflow system is designed to exploit the higher kinetic energy in the exhaust gases in order educe a flow of cooling air through the main central chamber 35, into the secondary chamber 26 via the flow passages 37 and outwardly into the exhaust flow path via the exhaust ports 38 in order to supplement the cooling effect of the fan 42. Additionally, the same eduction effect will also draw the compressed air directed through the labyrinth seal 39 through the secondary flow chamber 36 and into the exhaust flow path through the exhaust ports 38, thereby preventing its leakage into the machinery space 44 via the gap 40 around the shaft 17.

Additionally, the above-described operation of the fan 42 during idle conditions will create a reduced pressure within the main annular chamber 35, which will thus be effective to pull air from the secondary rear flow chamber 36, via the flow passages 37, thereby also drawing through the compressed air leaking through the labyrinth seal 39, thus preventing it from leaking into the machinery space 44 via the gap 40 around the shaft 17.

Figure 12:
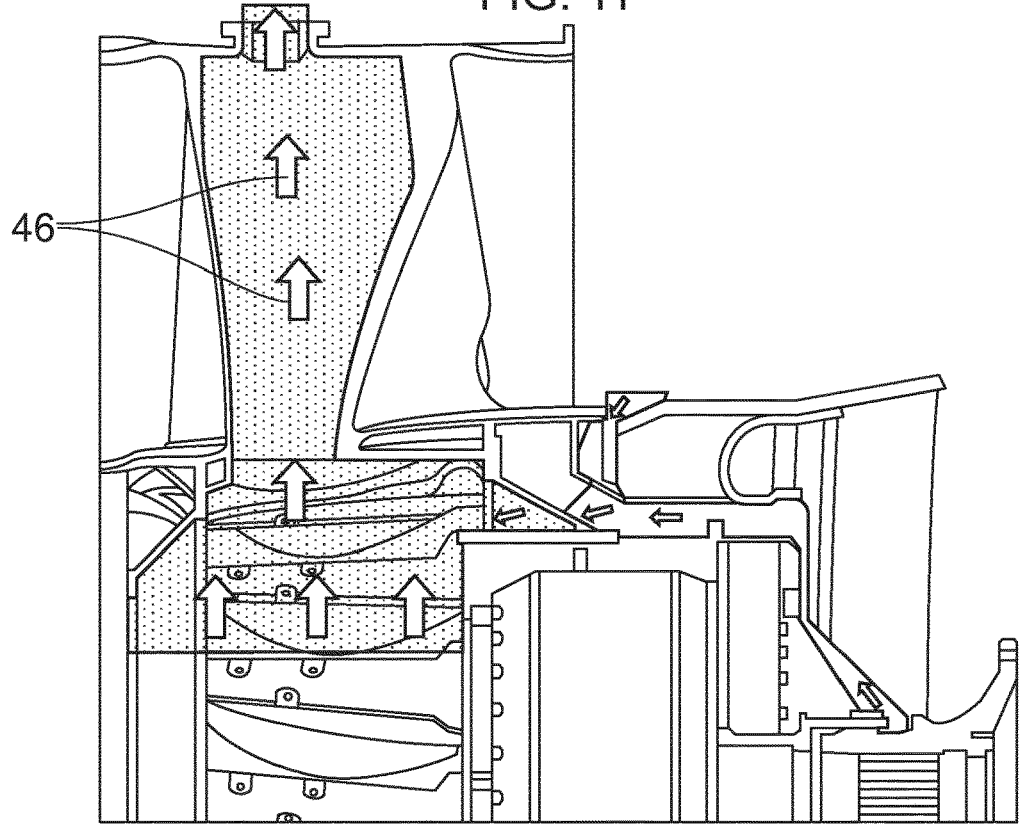
FIG. 12 is another schematic illustration similar to those of FIGS. 10 and 11, but which shows airflow characteristics at engine shut-down conditions.

FIG. 12 shows airflow characteristics of the arrangement when the engine is shut down (either intentionally or in an emergency situation). Such conditions are characterised by practically no flow of exhaust gases through the exhaust flow path, but also high surface temperatures on the gas-washed surfaces of the tail bearing housing and its vanes 25. It is therefore proposed to continue to operate the fan 42 in order to pull cooling air through the airflow passages 34a, 34b, 34c, 34m, 34j through the service vanes, and thus also through the central airflow chamber 35 of the tail bearing housing.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting.

The invention claimed is:

1. A turboshaft engine having a principal rotational axis, the turboshaft engine comprising:
    a power turbine, a tail bearing housing, and an exhaust collector arranged in axial flow series along the axis, the tail bearing housing including a labyrinth seal and having a radially central region defining a flow chamber for cooling air;
    an annular duct defined around the central region and which forms at least part of an exhaust flow passage for the flow of exhaust gases from the power turbine to the exhaust collector; and
    a compressor, wherein
    the flow chamber is provided in fluid communication with the exhaust collector via at least one exhaust port formed in the tail bearing housing and the flow of exhaust gases through the exhaust collector during operation of the engine educes a flow of cooling air through the flow chamber; and
    the labyrinth seal is configured for pressurisation by a flow of compressed air drawn from the compressor and directed through the labyrinth seal, the or each exhaust port being provided in fluid communication with the labyrinth seal and the flow of exhaust gases through the exhaust collector during operation of the engine educing a flow of the compressed air from the labyrinth seal, through the or each exhaust port, and into the exhaust flow.

2. A turboshaft engine according to claim 1 wherein the tail bearing housing further comprises a plurality of vanes extending radially outwardly from the central region and across the annular duct, at least some of the plurality of vanes having respective airflow passages therethrough which are arranged in fluid communication with the flow chamber for the passage of cooling air.

3. A turboshaft engine according to claim 2 wherein not all of the plurality of vanes have airflow passages in fluid communication with the flow chamber.

4. A turboshaft engine according to claim 2 wherein only vanes which carry either oil or vent pipes have the airflow passage in fluid communication with the flow chamber.

5. A turboshaft engine having a principal rotational axis, the turboshaft engine comprising:
    a power turbine, a tail bearing housing, and an exhaust collector arranged in axial flow series along the axis, the tail bearing housing having a radially central region defining a flow chamber for cooling air;
    an annular duct defined around the central region and which forms at least part of an exhaust flow passage for the flow of exhaust gases from the power turbine to the exhaust collector, the tail bearing housing having a plurality of vanes extending radially outwardly from the central region and across the annular duct, at least some of the plurality of vanes having respective airflow passages therethrough which are arranged in fluid communication with the flow chamber for the passage of cooling air; and
    a fan fluidly connected to at least one of the vane airflow passages, the fan being operable to draw cooling air radially outwardly from the flow chamber through the or each airflow passage to which it is connected, wherein
    the flow chamber is provided in fluid communication with the exhaust collector via at least one exhaust port formed in the tail bearing housing and the flow of exhaust gases through the exhaust collector during operation of the engine educes a flow of cooling air through the flow chamber.

6. A turboshaft engine according to claim 5 wherein the fan is operable, in the absence of a sufficient flow of exhaust gas through the exhaust collector, to draw a flow of cooling air through each vane airflow passage and through the flow chamber.

7. A turboshaft engine according to claim 6 wherein the fan is also operable, in the absence of a sufficient flow of exhaust gas through the exhaust collector, to draw a flow of compressed air from a labyrinth seal configured for pressurisation by a flow of compressed air drawn from a compressor and directed through the labyrinth seal.

8. A turboshaft engine according to claim 5 wherein the engine and the fan are provided with an acoustic housing.

9. A method of operating a turboshaft engine having a principal rotational axis, the method comprising:
provide the turboshaft engine comprising:
a power turbine, a tail bearing housing, and an exhaust collector arranged in axial flow series along the axis, the tail bearing housing including a labyrinth seal and having a radially central region defining a flow chamber for cooling air,
an annular duct defined around the central region and which forms at least part of an exhaust flow passage for the flow of exhaust gases from the power turbine to the exhaust collector, and
a compressor, wherein
the flow chamber is provided in fluid communication with the exhaust collector via at least one exhaust port formed in the tail bearing housing, and
the labyrinth seal is provided in fluid communication with the or each exhaust port,
directing sufficient flow of exhaust gas through the exhaust collector to educe a flow of cooling air through the flow chamber and into the exhaust collector via the or each exhaust port; and
drawing a flow of compressed air from the compressor and directing it through the labyrinth seal to pressurise the seal, and directing sufficient flow of exhaust gas from the power turbine along the exhaust collector to educe a flow of the compressed air from the labyrinth seal and into the exhaust flow via the or each exhaust port.

10. A method according to claim 9 performed on an engine whose tail bearing housing further comprises a plurality of vanes extending radially outwardly from the central region and across the annular duct, at least some of the plurality of vanes being provided with respective airflow passages therethrough which are arranged in fluid communication with the flow chamber for the passage of cooling air, wherein the step of directing exhaust gas involves directing a sufficient flow of exhaust gas through the exhaust collector to draw a flow of cooling air through at least some of the airflow passages, through the flow chamber, and into the exhaust flow via the or each exhaust port.

11. A method according to claim 10 wherein the cooling air is only drawn through the airflow passages which are provided through vanes carrying either oil or vent pipes.

12. A method of operating a turboshaft engine having a principal rotational axis, the method comprising:
providing the turboshaft engine comprising:
a power turbine, a tail bearing housing, and an exhaust collector arranged in axial flow series along the axis, the tail bearing housing having a radially central region defining a flow chamber for cooling air, the flow chamber being provided in fluid communication with the exhaust collector via at least one exhaust port formed in the tail bearing housing;
an annular duct defined around the central region and which forms at least part of an exhaust flow passage for the flow of exhaust gases from the power turbine to the exhaust collector, the tail bearing housing having a plurality of vanes extending radially outwardly from the central region and across the annular duct, at least some of the vanes being provided with respective airflow passages therethrough which are arranged in fluid communication with the flow chamber for the passage of cooling air, and
a fan fluidly connected to at least one of the vane airflow passages,
directing sufficient flow of exhaust gas through the exhaust collector to educe a flow of cooling air through at least some of the airflow passages, through the flow chamber, and into the exhaust collector via the or each exhaust port; and
operating the fan to draw cooling air radially outwardly from the flow chamber through the or each vane airflow passage to which it is connected.

13. A method according to claim 12 the fan is operated to draw a flow of cooling air through each vane airflow passage and through the flow chamber when the flow of exhaust gas through the exhaust collector is insufficient to educe a flow of cooling air through the flow chamber and into the exhaust flow via the or each exhaust port.

14. A method according to claim 13 wherein the fan is operated to draw a flow of the compressed air from a labyrinth seal and through the flow chamber when the flow of exhaust gas through the exhaust collector is insufficient to educe a flow of the compressed air from the labyrinth seal and into the exhaust flow via the or each exhaust port.

* * * * *